United States Patent [19]
Cheng

[11] Patent Number: 5,761,754
[45] Date of Patent: Jun. 9, 1998

[54] FOLDABLE BABY PLAYPEN

[75] Inventor: Ying-Hsiung Cheng, Tainen Hsien, Taiwan

[73] Assignee: Top Fortune Ltd., San Diego, Calif.

[21] Appl. No.: 814,708

[22] Filed: Mar. 11, 1997

[51] Int. Cl.$^6$ .................... A47D 13/06; A47D 7/01
[52] U.S. Cl. ........................... 5/99.1; 5/98.1
[58] Field of Search ................ 5/99.1, 98.1, 93.1

[56] References Cited

U.S. PATENT DOCUMENTS

| | | | |
|---|---|---|---|
| 5,446,931 | 9/1995 | Wei | 5/98.1 |
| 5,504,951 | 4/1996 | Yem | 5/99.1 |
| 5,615,427 | 4/1997 | Huang | 5/99.1 |

*Primary Examiner*—Alexander Grosz
*Attorney, Agent, or Firm*—Morton J. Rosenberg; David I. Klein; Jun Y. Lee

[57] ABSTRACT

A baby playpen is provided that includes an upper frame, a lower frame and four feet connected with four foot bases. The upper frame, the lower frame and the four feet with the four foot bases form a framework, which may be collapsed in half by means of fold connecters, fold joints, etc. A mesh net covers the whole framework and a floor pad is located on a bottom portion thereof. The playpen can be extended or collapsed by pulling a pull band to collapse the whole framework directly, without necessity of removing the floor pad.

1 Claim, 17 Drawing Sheets

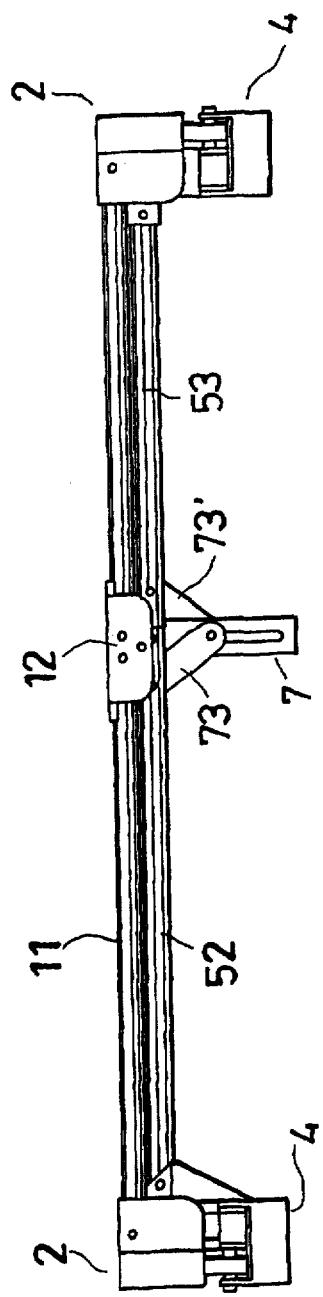
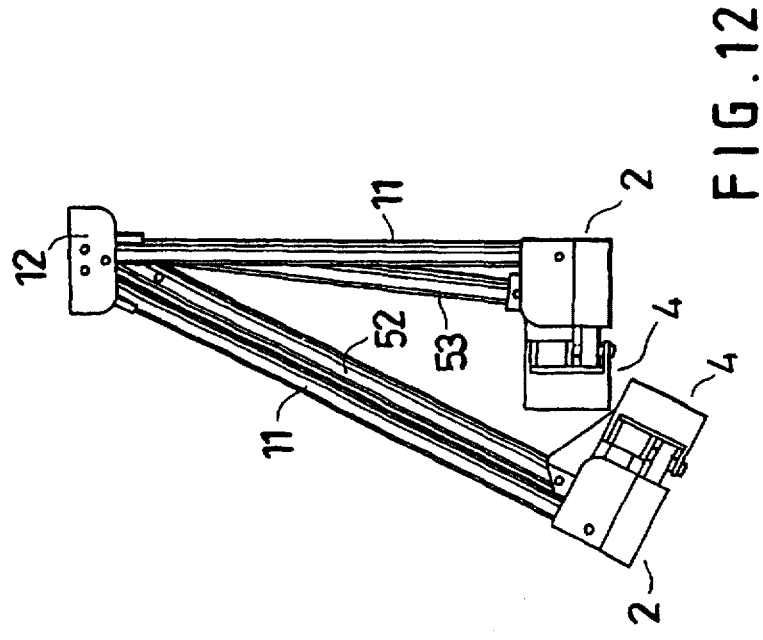
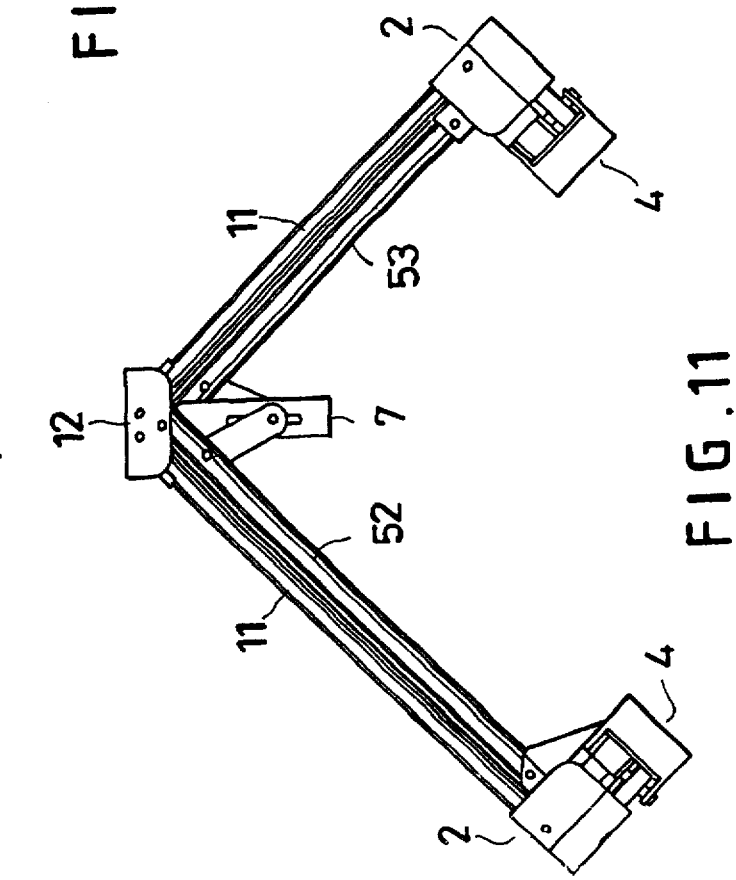
FIG.10
FIG.12
FIG.11

FOLDABLE BABY PLAYPEN

BACKGROUND OF THE INVENTION

This invention directs itself to a baby playpen. More particularly, this invention is directed to a baby playpen that can be collapsed directed without the necessity of removing a floor pad from the playpen. The disclosed playpen is able to be collapsed to a very small dimension can able to be carried on a shoulder. Additionally, the present invention has joints that are structured to prevent accidents from happening.

A conventional baby playpen has been generally designed to have a secure and safe structure and to be handled easily. Such playpens usually have a upper frame, a lower frame, corner joints, foot bases, crossing rod units, connect rods, movable bases, a mesh net and a floor pad combined together. The upper frame is pivotally connected to the corner joints, which are then connected with vertical rods connected to the foot bases. That structure forms a framework of the playpen to be covered by the mesh net and receiving a floor pad that is placed on a bottom of the framework. The intermediate portions of the upper frame are provided with foldable and lockable joints, and the lower frame includes two crossing rod units connected pivotally with connect rods, movable bases, position bases and fold units limiting the folding angle. Then the lower frame can be pulled upward by a pull band for collapsing the structure.

However, the conventional playpen described above has a disadvantage that the floor pad has to be removed before the playpen is collapsed, and in addition, the floor pad has to be bound to the collapsed playpen to secure the collapsed condition. In expanding the playpen, the floor pad has to be released first, and then the playpen can be expanded, resulting in inconvenience in the practical use thereof.

SUMMARY OF THE INVENTION

This invention has been devised to provide an improved baby playpen that overcomes the disadvantage of the conventional one mentioned above.

A feature of the invention is a framework structure consisting of an upper frame, a lower frame, and four vertical feet supported on four foot bases. The upper frame has four side rods connected with four corner joints, with two lengthwise rods respectively connected with intermediate fold connecters. The lower frame has four side rods connected with connecters, swingable connecters and slide members, the side rods being connected with the foot bases with the swingable connecters. The whole framework can then be folded with two opposite sides laid on each other, by pulling a pull band, making it unnecessary to remove a floor pad from the playpen.

BRIEF DESCRIPTION OF DRAWINGS

This invention will be better understood by referring to the accompanying drawings, wherein:

FIG. 10 is a side view showing an upper frame moved to lie on a lower frame after the vertical rods are completely collapsed in the preferred embodiment of the present invention;

FIG. 11 is an illustration of the upper frame laid on the lower frame and together being folded in the preferred embodiment of the present invention;

FIG. 12 is an illustration of the upper frame laid on the lower frame and folded in half in the preferred embodiment of the present invention;

FIG. 17 is a side view of a pull band of the preferred embodiment of the present invention, illustrating the direction it is pulled in;

DESCRIPTION OF THE PREFERRED EMBODIMENT

Figure 1:
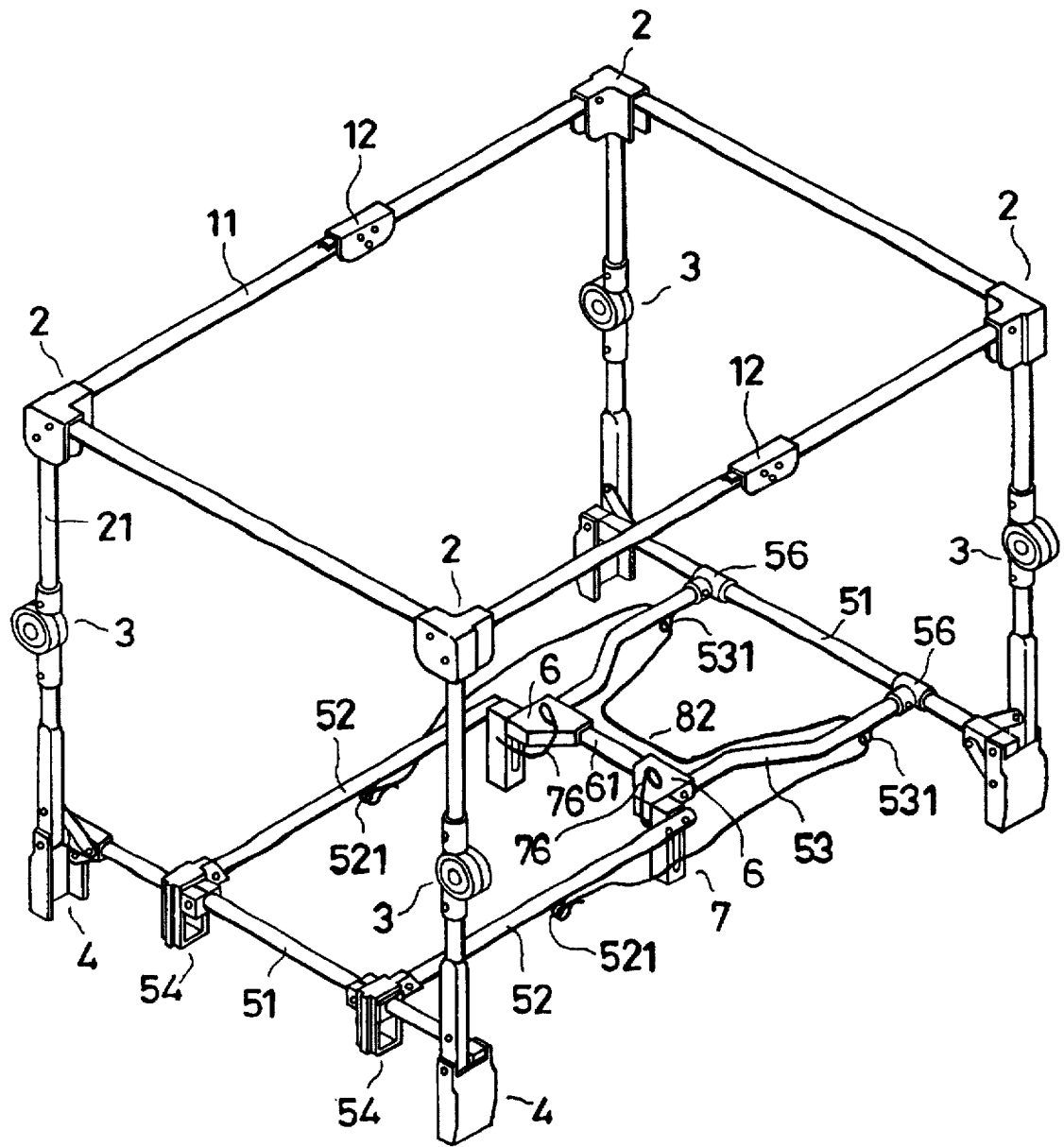
FIG. 1 is a perspective view of a framework of a preferred embodiment of the present invention.
Figure 2:
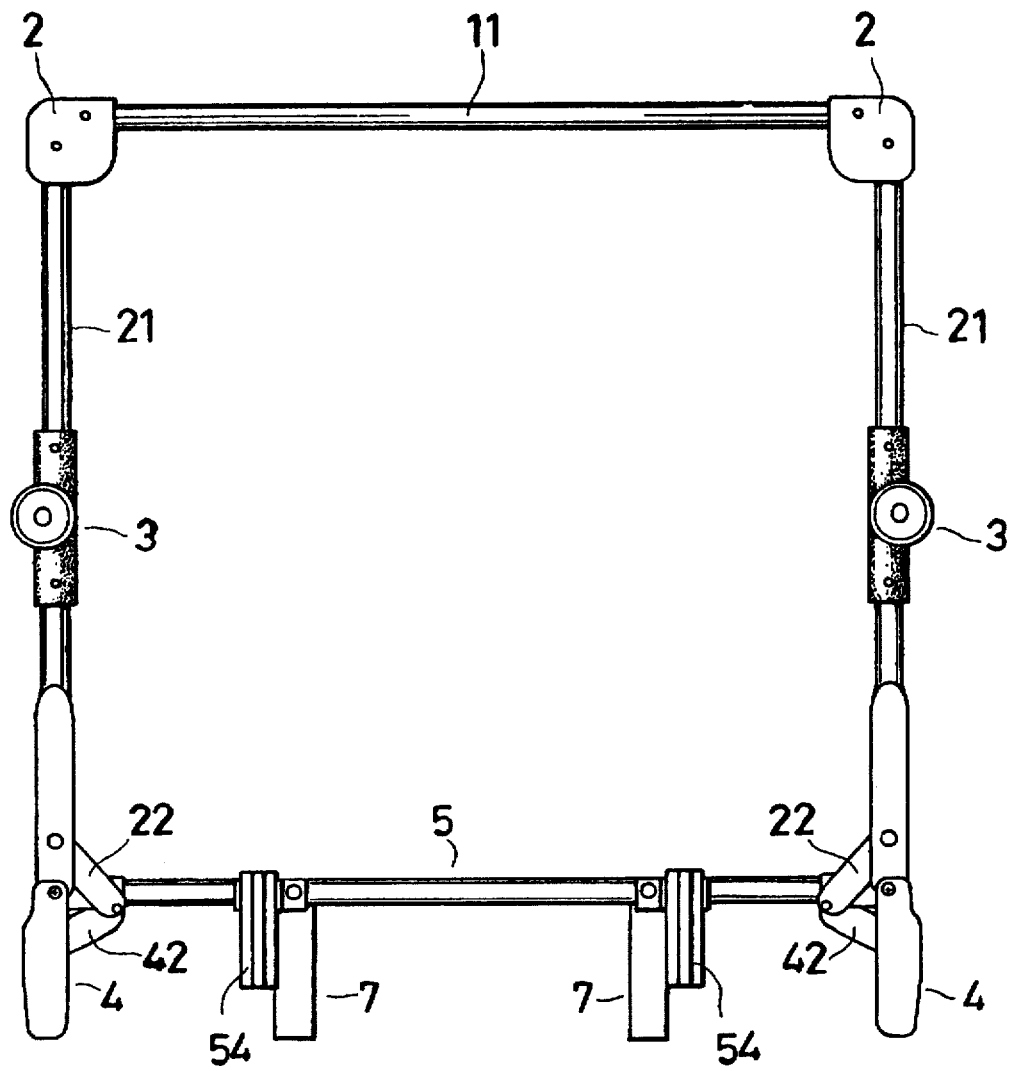
FIG. 2 is a front view of the framework of the preferred embodiment of the present invention.
Figure 3:
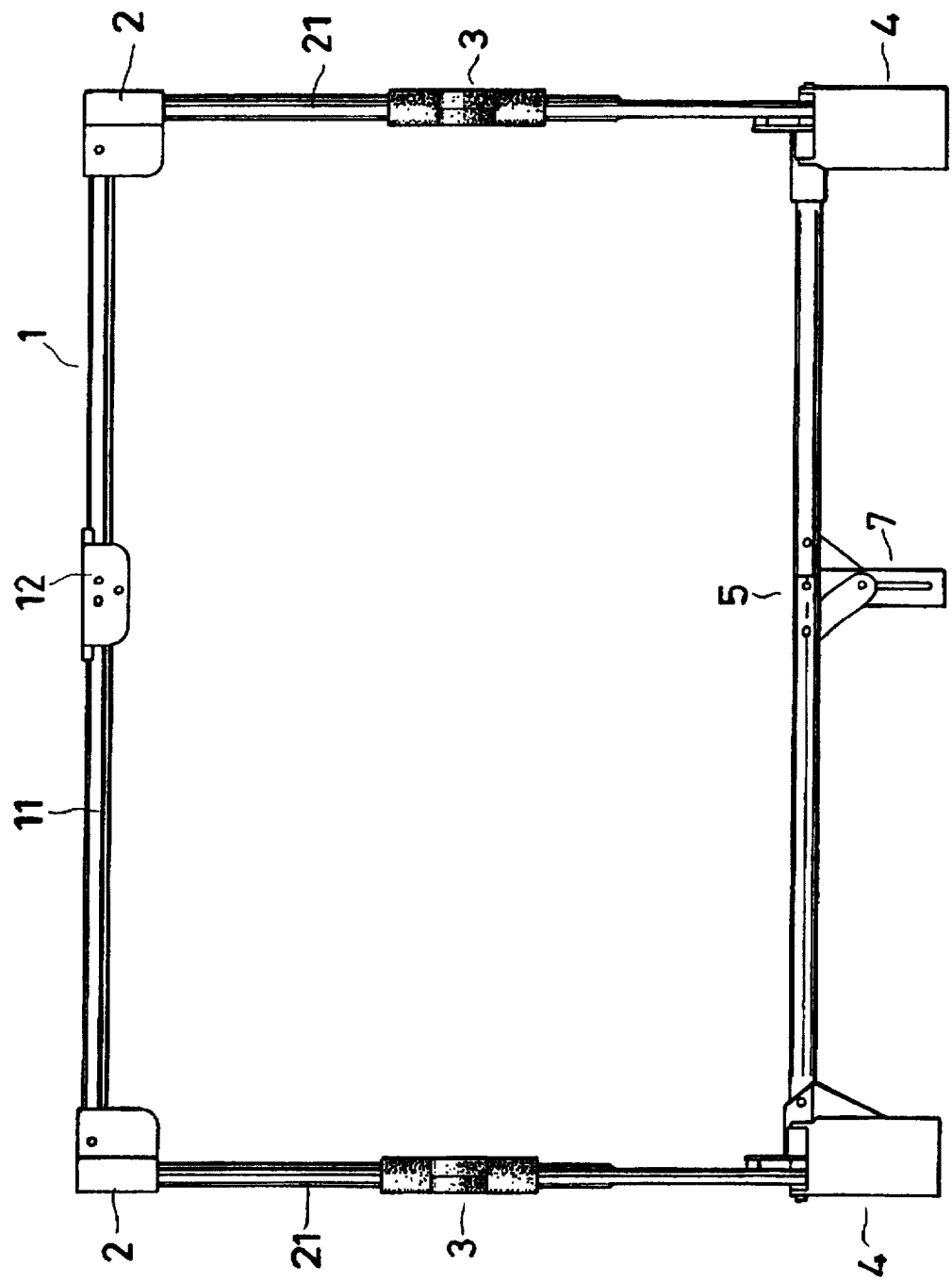
FIG. 3 is a side view of the framework of the preferred embodiment of the present invention.

A preferred embodiment of a baby playpen in the present invention, as shown in FIGS. 1–26, includes an upper frame 1, a plurality of corner joints 2, a plurality of fold joints 3, four foot bases 4, a lower frame 5, two middle connecters 6, 6, two slide members 7, 7, a mesh net 8, a floor pad 81 and back gand 82 as main components that are combined together.

Figure 25:
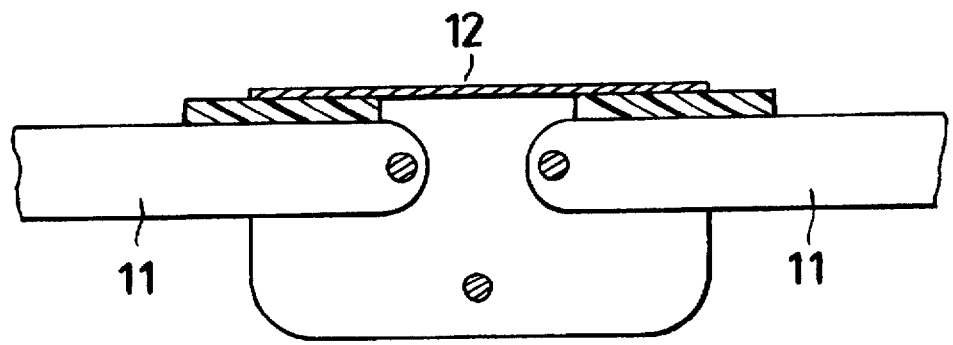
FIG. 25 is a side view of a fold connecter of the preferred embodiment of the present invention; and, FIG. 26 is a side view of the fold connecter of the preferred embodiment of the present invention, showing how a lengthwise rod of the upper frame is folded in half.
Figure 26:
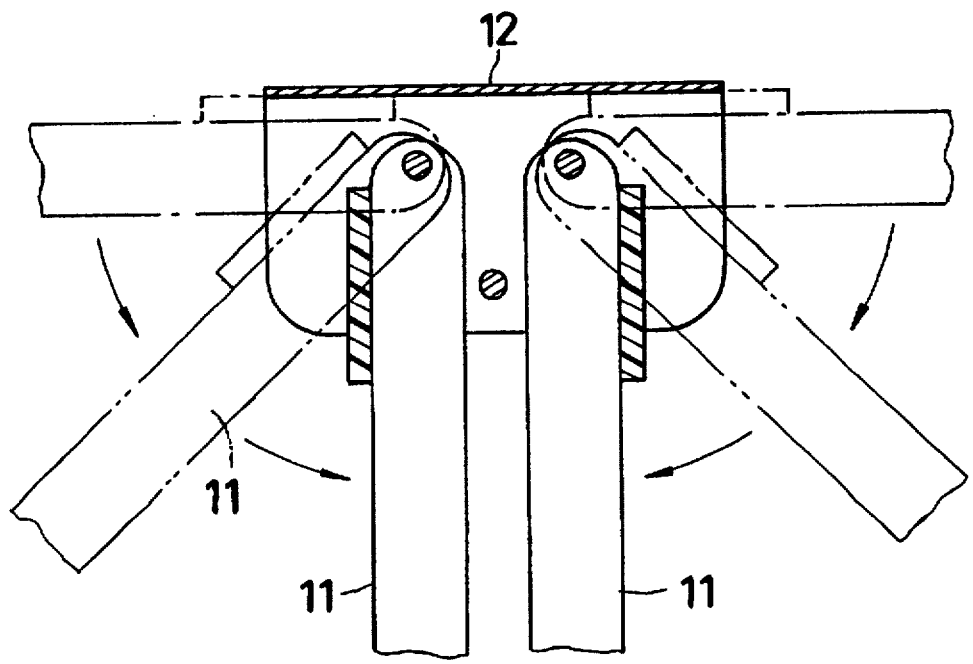

The upper frame 1 consists of two lateral rods, two lengthwise rods 11 respectively having an intermediate fold connecter 12 connecting two portions of each rod 11, four corner joints 2 connecting the lateral rods and the two lengthwise rods 11 so that the lengthwise rods may be folded downward, as shown in FIG. 25.

Figure 5:
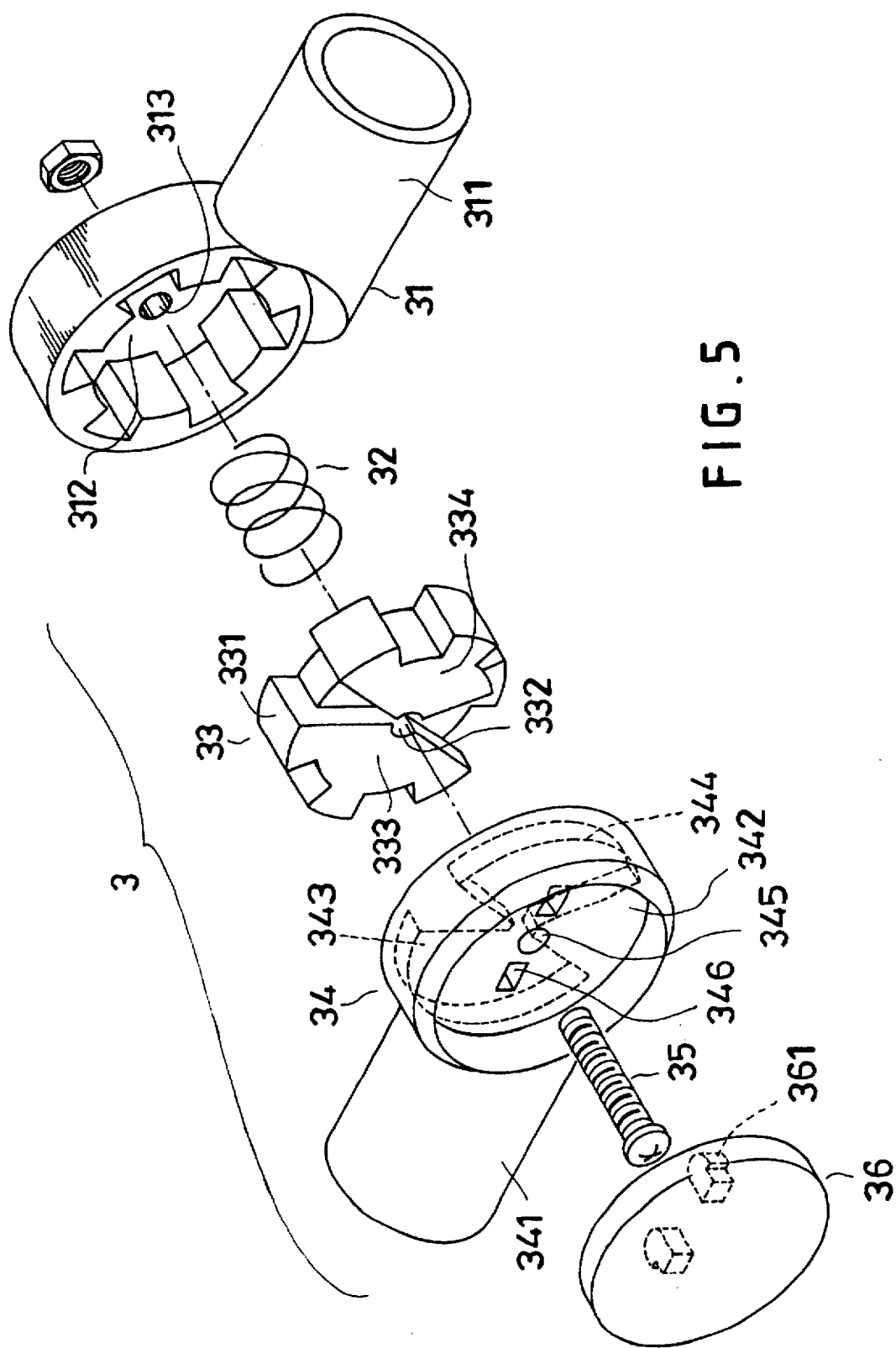
FIG. 5 is an exploded perspective view of a fold joint of the present invention.
Figure 15:
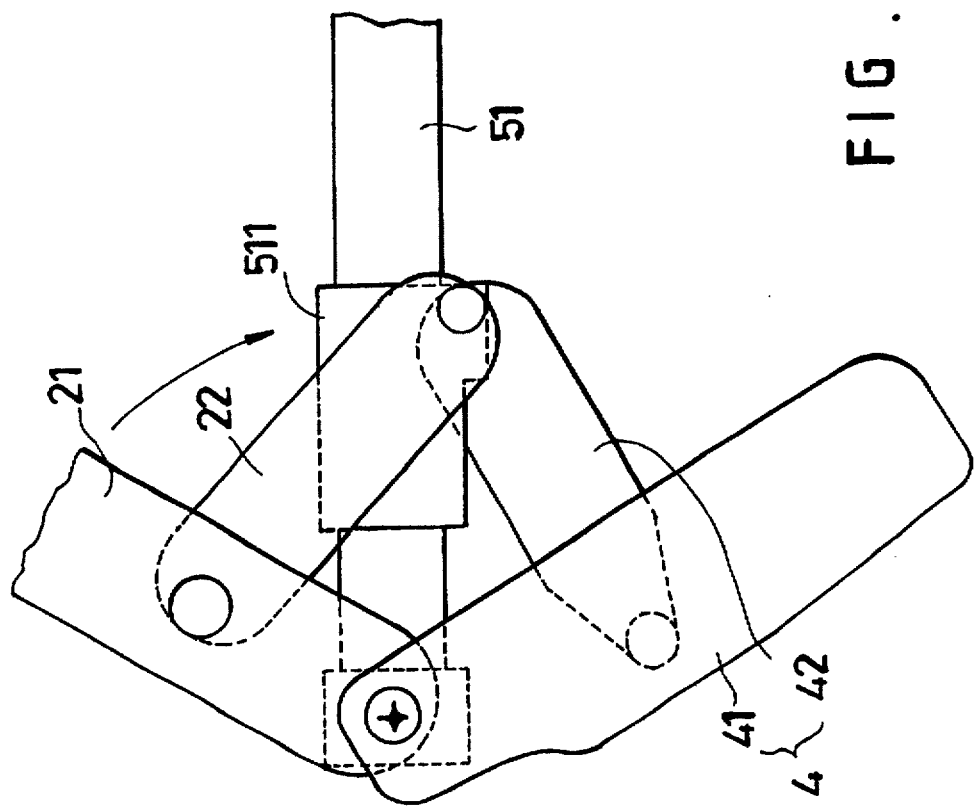
FIG. 15 is a side view of the foot, the vertical rod and the link piece of the preferred embodiment of the present invention, showing them being folded inwardly.
Figure 14:
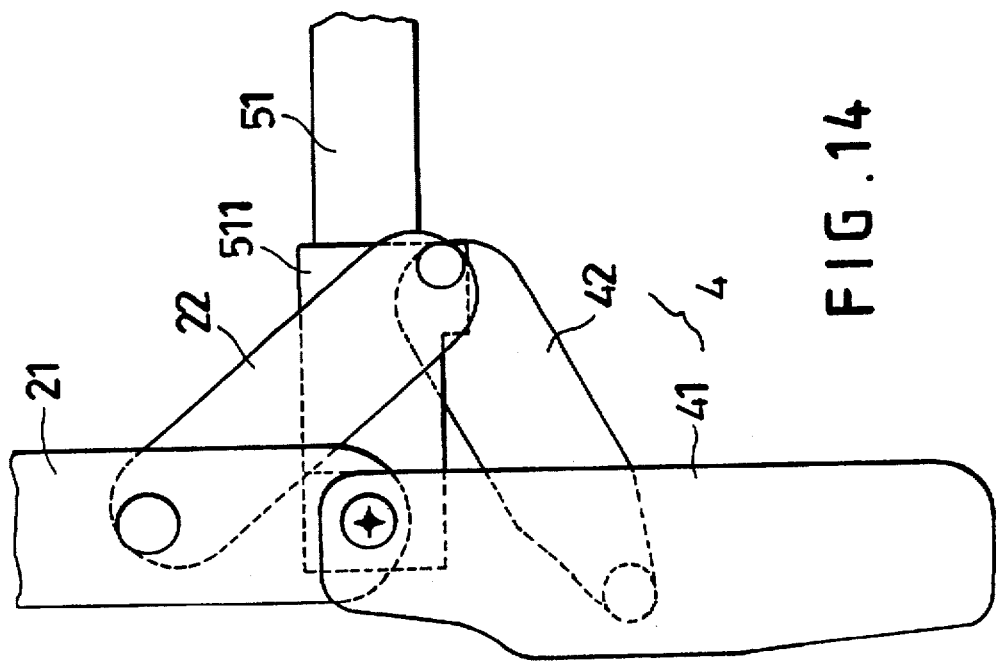
FIG. 14 is a magnified side view of a foot, a vertical rod and a link piece of the preferred embodiment of the present invention.

Each corner joint 2, as shown in FIG. 5, is respectively connected with a vertical foot 21 having an intermediate fold joint 3 in a middle region, to permit the foot 21 to be folded in half. The vertical foot has a lower end connected to a foot base 4 that stands on the ground. As shown in FIGS. 14 and 15, each foot 21 has its lower end pivotally connected with an upper end of a link piece 22, the opposing end of link 22 being connected to a movable sleeve 511 of a lateral rod 51 of the lower frame 5.

Each fold joint 3, as shown in FIG. 5, consists of an inner tooth member 31, an engage block 33 and a swingable member 34 combined together. The inner tooth member 31 has a tubular portion 311 for receiving the vertical foot 21 therein, and an inner recessed tooth portion 312 extending from the tubular portion 311 and having a centrally disposed hole 313 formed therethrough. The engage block 33 has a plurality of radial teeth 331 to engage with the tooth shaped recesses of the recessed tooth portion 312, a centrally disposed recess 332 in a right side wall thereof for receiving a spring 32 therein, and a large sector-shaped recess 333 and a small sector-shaped recess 334 formed in a left side wall. The swingable member 34 has a disc portion provided with a large sector-shaped projection 343 and a small sector-shaped projection 344 engaging the large and the small sector-shaped recesses 333, 334 and a tubular portion 341 extending from the disc portion for another foot 21 to insert therein. The disc portion has a round recess 342 for a press button 36 to fit therein and a centrally disposed hole 345 for engagement with a screw. The disc portion also has spaced slots 346, 346 located on opposite sides of the central hole 345 for receiving position posts 361, 361 of the press button 36 therein.

When the press button 36 is pressed down, the two position posts 361, 361 push the engage block 33 toward the inner teeth unit 31. The large and the small sector-shaped recesses 333, 334 then disengage from the large- and the small sector-shaped projections 343, 344, so that the tubular portion 341 together with the vertical rod 21 becomes foldable. The large sector-shaped recess 333 faces the small sector-shaped projection 344 to prevent the swingable member 34 from engaging with the engage block 33. Then, the fold joint 3 is in an unlocked condition after being folded, making it convenient for expanding the playpen next time it is to be used.

Each foot base 4 has a post 41, the upper end of the post 41 being connected to the vertical foot 21 and a lateral rod 51 of the lower frame 5, with a link piece 42 pivotally connected to the post 41 and a movable sleeve 511 slidably coupled to the lateral rod 51, as shown in FIG. 14.

Figure 6:
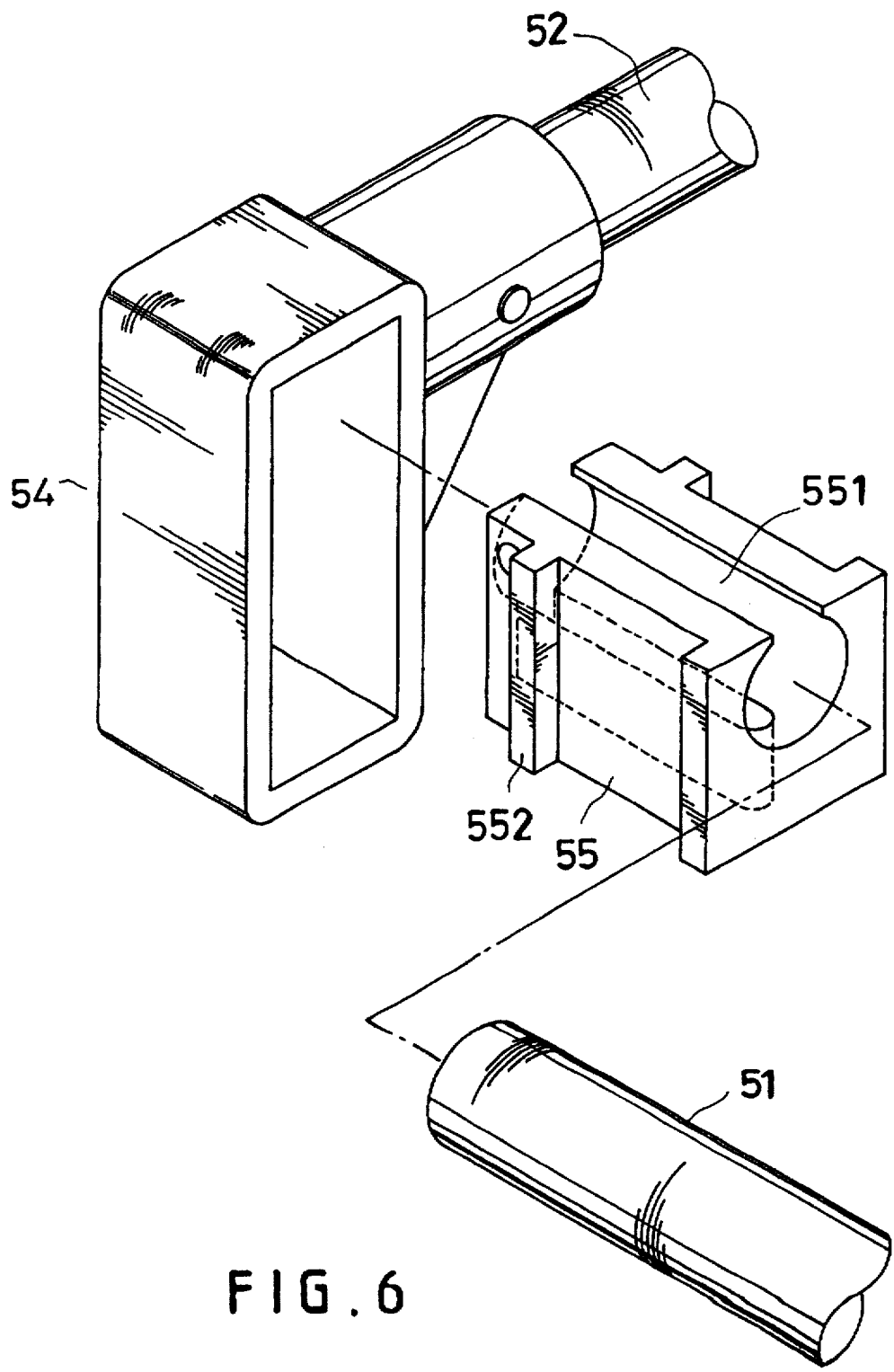
FIG. 6 is an exploded perspective view of a connecter unit of the present invention.
Figure 7:
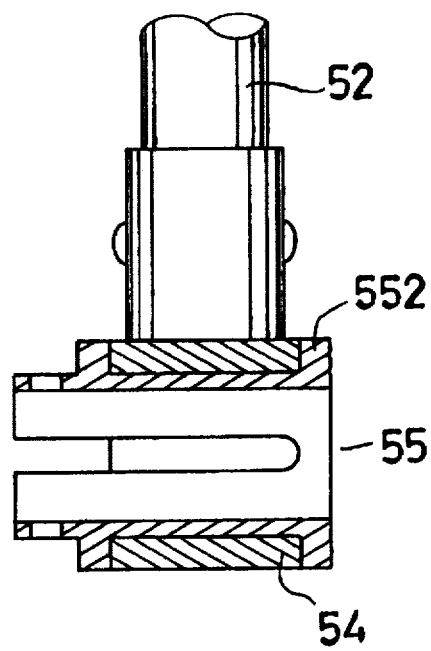
FIG. 7 is an upper cross-sectional view of the connecter unit of the present invention.
Figure 8:
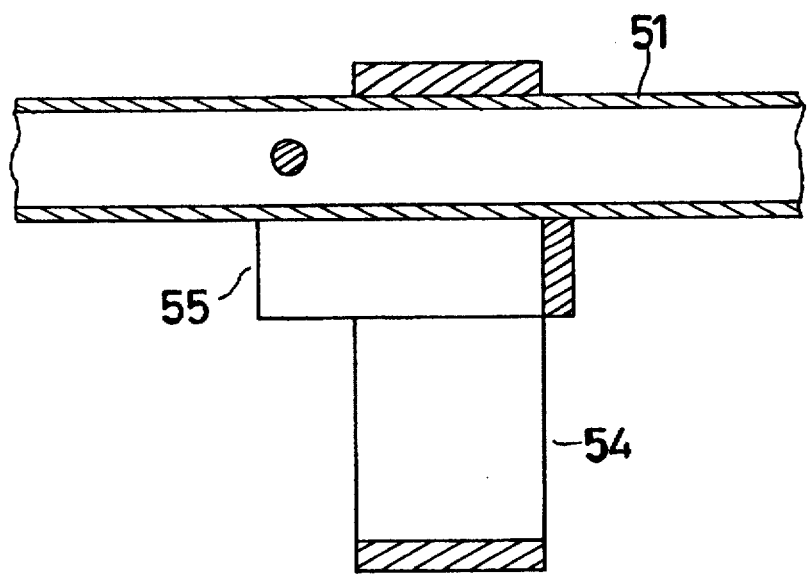
FIG. 8 is a front cross-sectional view of the connecter unit of the present invention.

The lower frame 5 consists of two lateral rods 51, 51 with movable sleeves 511 movably disposed on the two ends of each lateral rod 51. The lower frame 5 also includes straight rods 52, 52 and two bent rods 53, 53 connected to the two straight rods 52, 52, forming a substantially H-shaped frame. Two pairs of rings 521, 521; 531, 531 are respectively fixed under the lengthwise straight rods 52, 52 and the lengthwise bent rods 53, 53, as shown in FIG. 1. Further, a connecter unit 54 is respectively used to connect an outer end of each straight rod 52 with the lateral rod 51, as shown in FIGS. 6–8. The connecter unit 54 has a hollow interior for receiving a movable block 55 therein. The movable block 55 has a C-shaped channel 551 formed therein for receiving the lateral rod 51 therein, a vertical stop wall 552 extending from each side wall for retention within the connecter unit 54. The connecter unit 54 further has a tubular portion extending sidewise for receiving one end of the straight rod 52 therein, the other end of the rod 52 being pivotally connected with a slide member 7. The lateral rod 51 and the bent rod 53 are connected with a T joint 56.

The two connecters 6, 6 are used to connect two ends of a middle lateral rod 61, and respectively pivotally connected with the two slide members 7, 7 provided between the inner end of each straight rod 52.

Figures 20, 21:
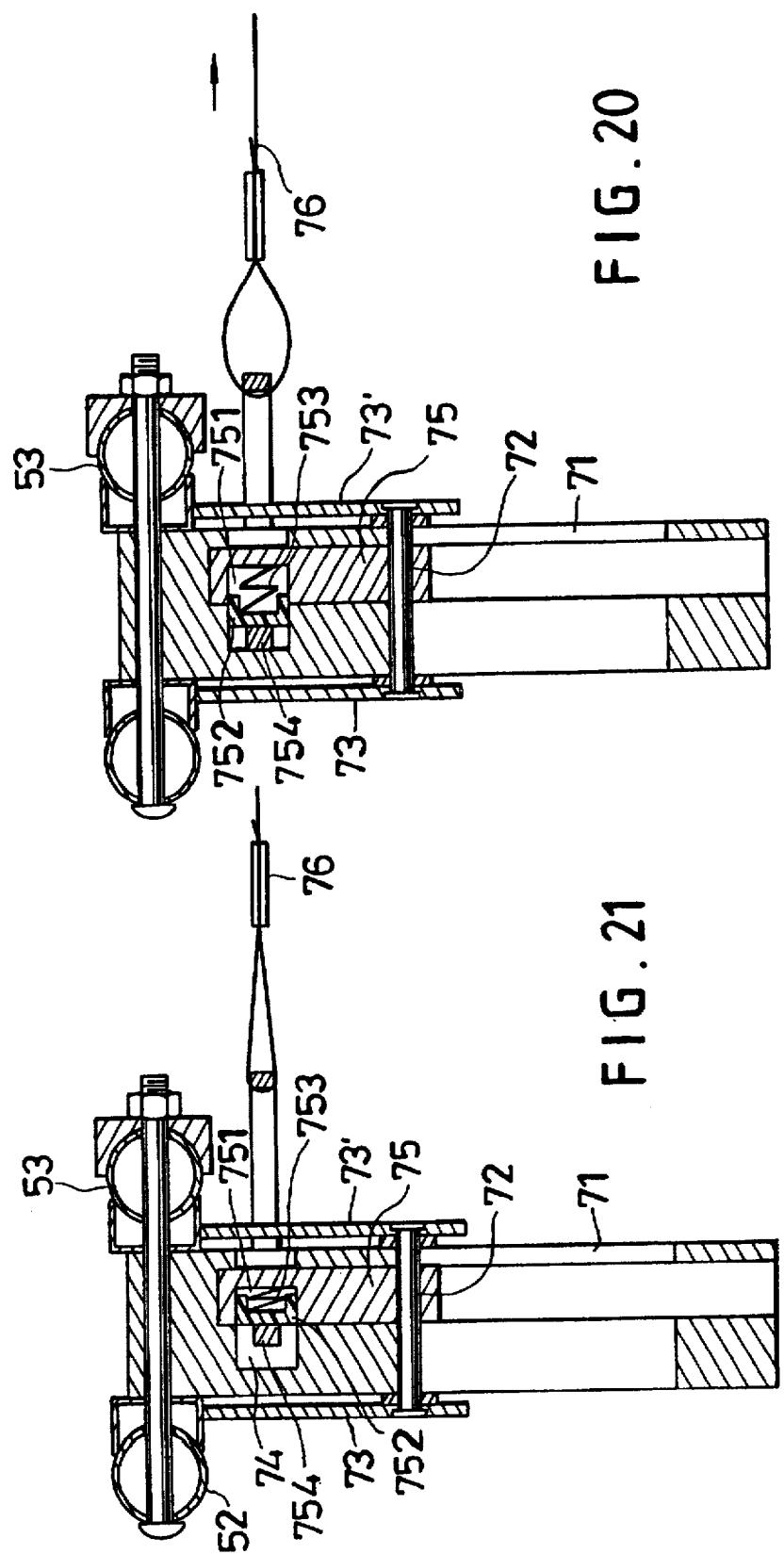
FIG. 20 is a side cross-sectional view of the pull band of the preferred embodiment of the present invention, before it is pulled inward and upward.
FIG. 21 is a side cross-sectional view of the pull band of the preferred embodiment of the present invention, after it is pulled inward and upward.
Figure 22:
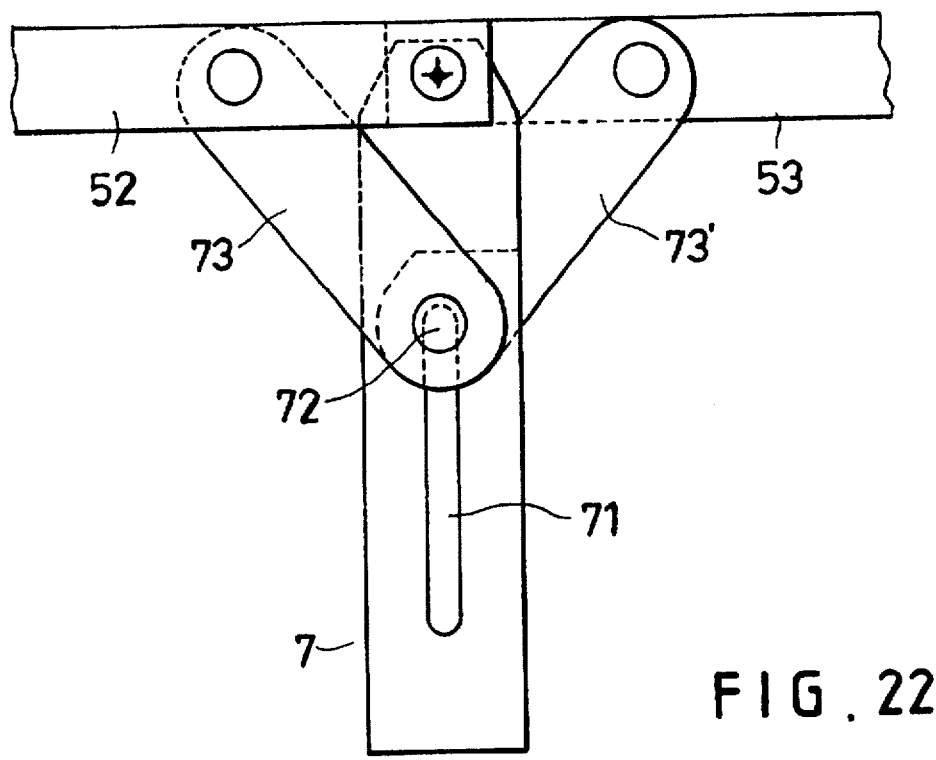
FIG. 22 is a side view of a slide member of the preferred embodiment of the present invention, before the upper and the lower frame are folded in half.
Figure 23:
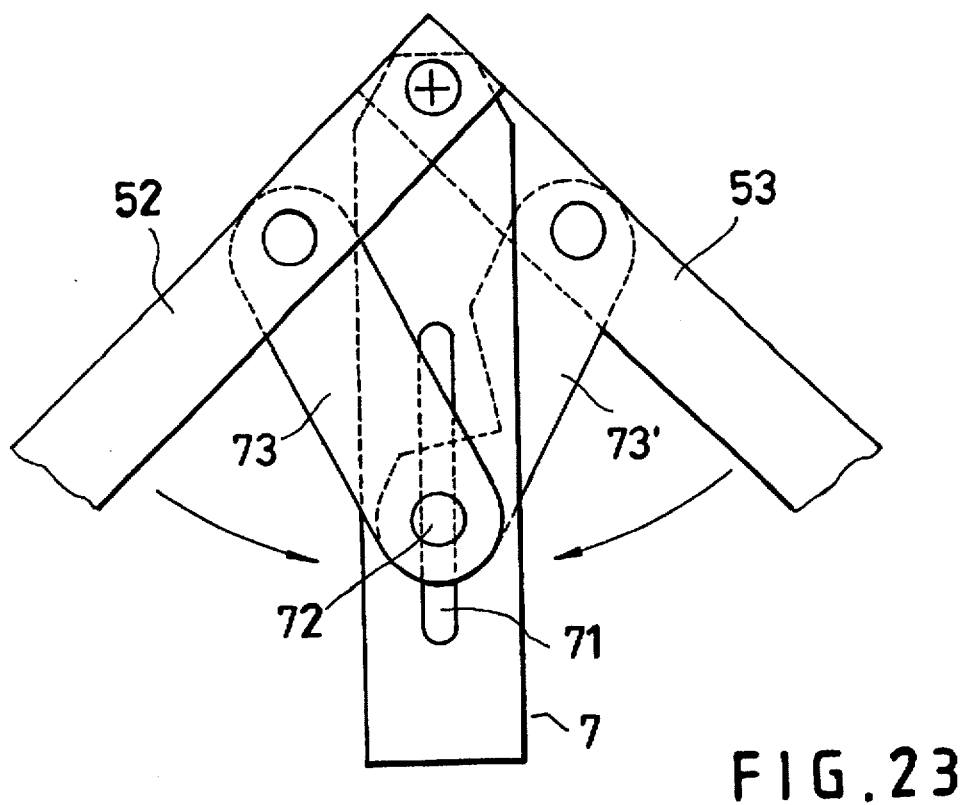
FIG. 23 is a side view of the slide member of the preferred embodiment of the present invention, with the upper and the lower frame being folded in half.
Figure 24:
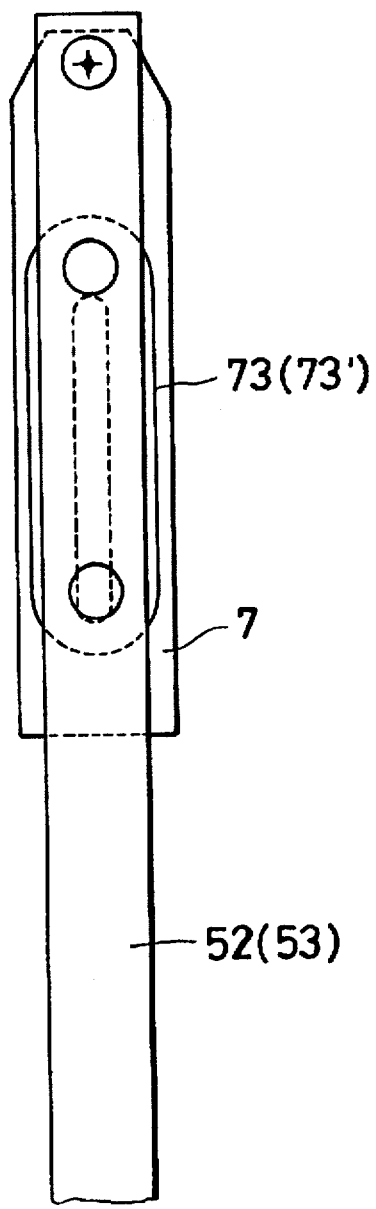
FIG. 24 is a side view of the slide member of the preferred embodiment of the present invention, with the upper and the lower frame completely folded in half.

The two slide member 7, 7 are hollow, as shown in FIGS. 20 and 22, having an elongated slot 71 formed through two opposing side walls thereof. A pin 72 is movably disposed in the two slots 71, 71 and pivotally connects two link pieces 73, 73' at respective ends thereof. The opposing ends of the two link pieces 73, 73' are respectively connected to a respective straight rod 52 and bent rod 53. Each slide member 7 has a cavity 74 formed therein and a slide block 75 disposed in an interior portion thereof. The slide block 75 has a recess 751, a U-shaped piece 752 and a spring 753 disposed in the recess 751. A bind band 754 extends through the cavity 74 overt he U-shaped piece 752, and a pull band 76 passes around the bind band 754, its opposing ends being sewn firmly to a floor pad 81.

Figure 4:
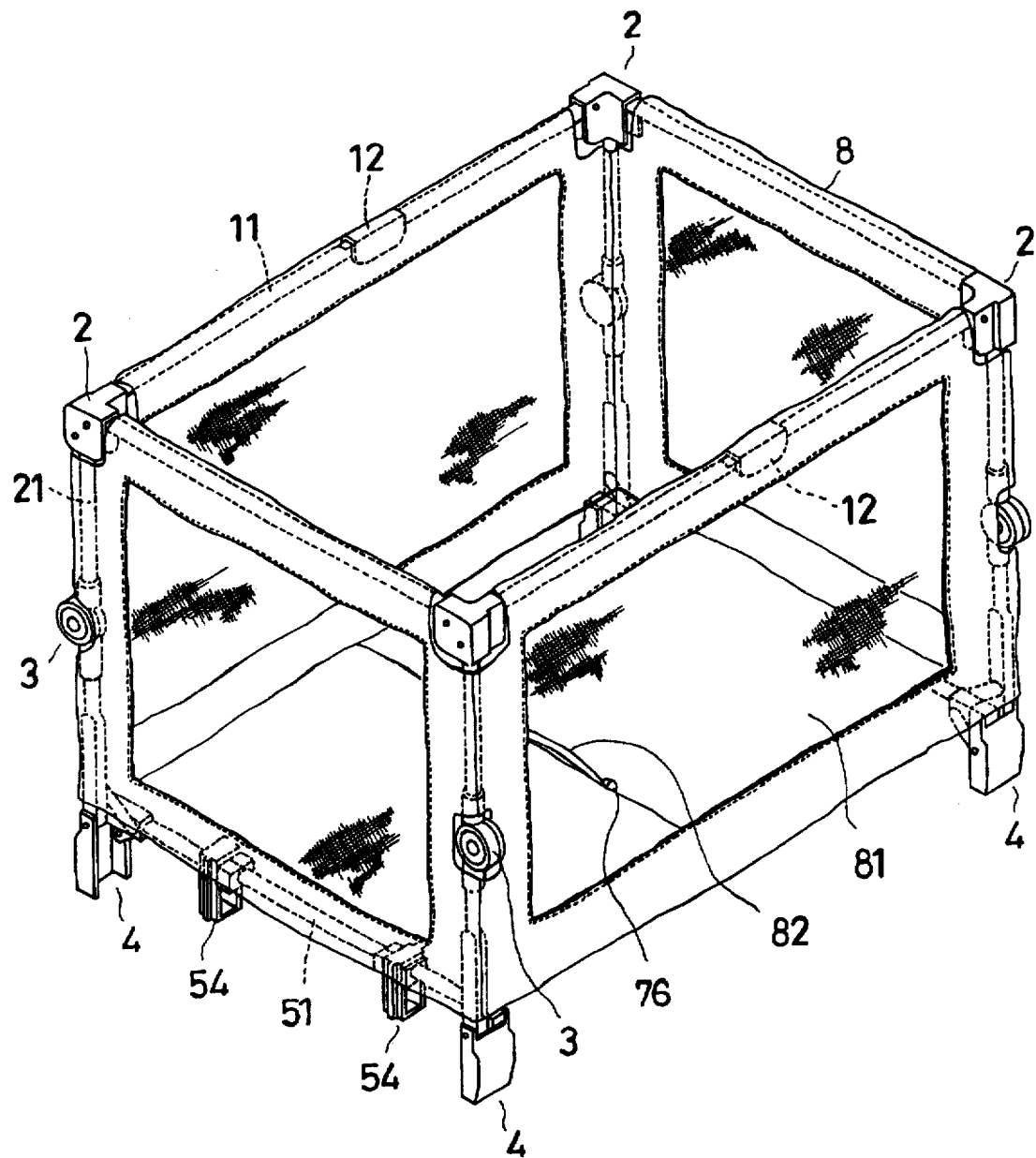
FIG. 4 is a perspective view of the preferred embodiment of a baby playpen of the present invention.

As described above, after the framework of the playpen is combined together, the mesh net 8 and the floor pad 81 are laid on the framework, as shown in FIG. 4. The floor pad 81 is secured on the straight rods 52, 52 and the bent rods 53, 53 with strings. The back band 82 is arranged to extend around the rings 521, 531 and through holes formed through the floor pad 81.

When the playpen is to be extended from the collapsed condition, the mesh net 8 with the framework is pulled horizontally on both sides. That forces the link pieces 73, 73' to extend, with their respective ends moving towards the upper ends of the elongate slots 71, 71 and with the slide blocks 75, 75 sliding up, to permit the U-shaped piece 752 to be engaged within the cavity 74, and elastically urged into cavity 74 by the spring 753, to secure the lower frame 5 in place. Then the four corner joints 2 are pulled up, forcing the four feet 21 to straighten, with the large and the small sector-shaped recesses 333, 334 of the engage blocks 33 engaging the large and the small sector-shaped projections 343, 344 of the swingable member 34, locking the four feet 21 in place. Meanwhile, the movable sleeves 511, connected to the link pieces 22, move to the two ends of the lateral rod 61, with the other link piece 42 moved to push the foot 41 to an upright position, to extend the playpen.

Figure 9:
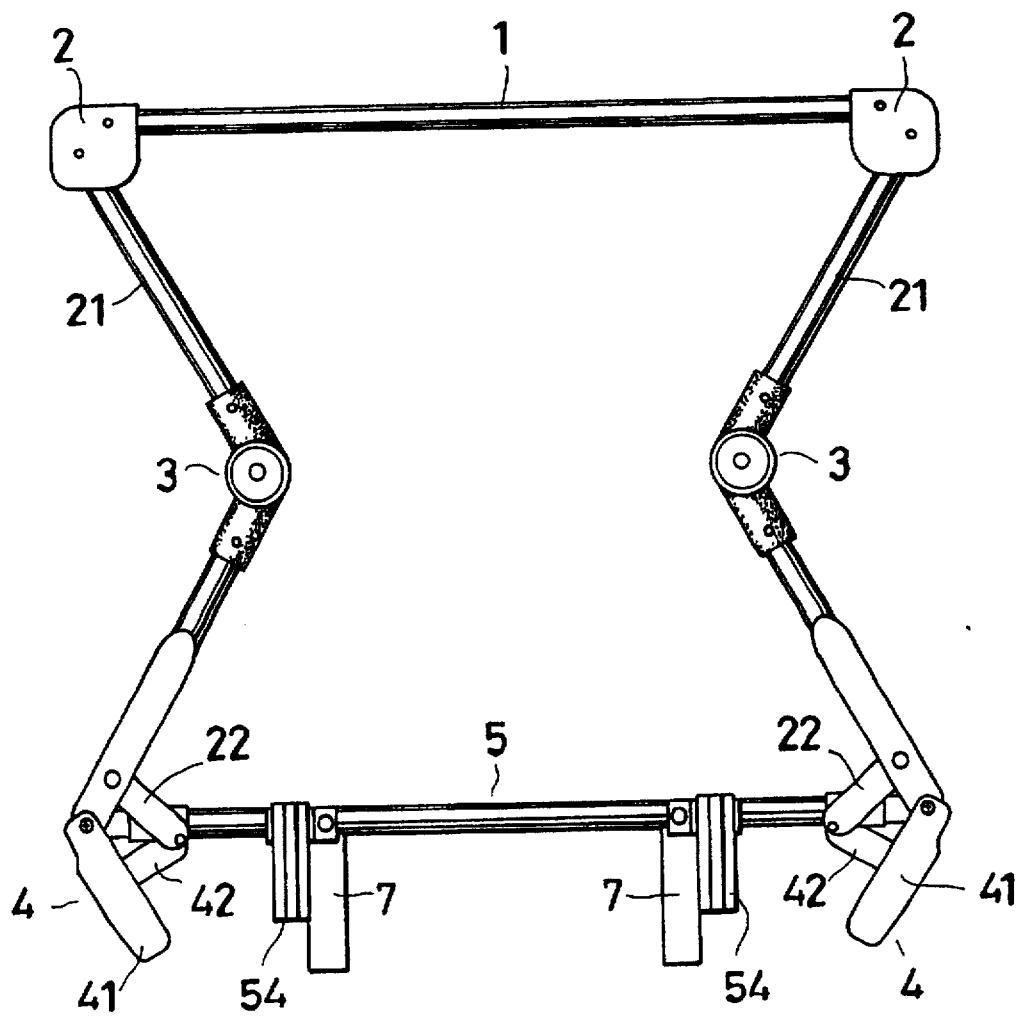
FIG. 9 is a side view showing a vertical rod being folded inward in the preferred embodiment of the present invention.
Figure 13:
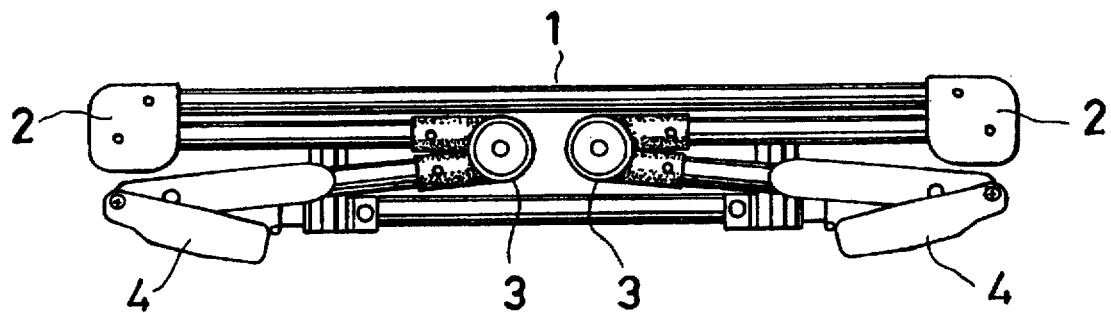
FIG. 13 is a front view of the upper frame and the lower frame completely folded together in the preferred embodiment of the present invention.
Figure 17:
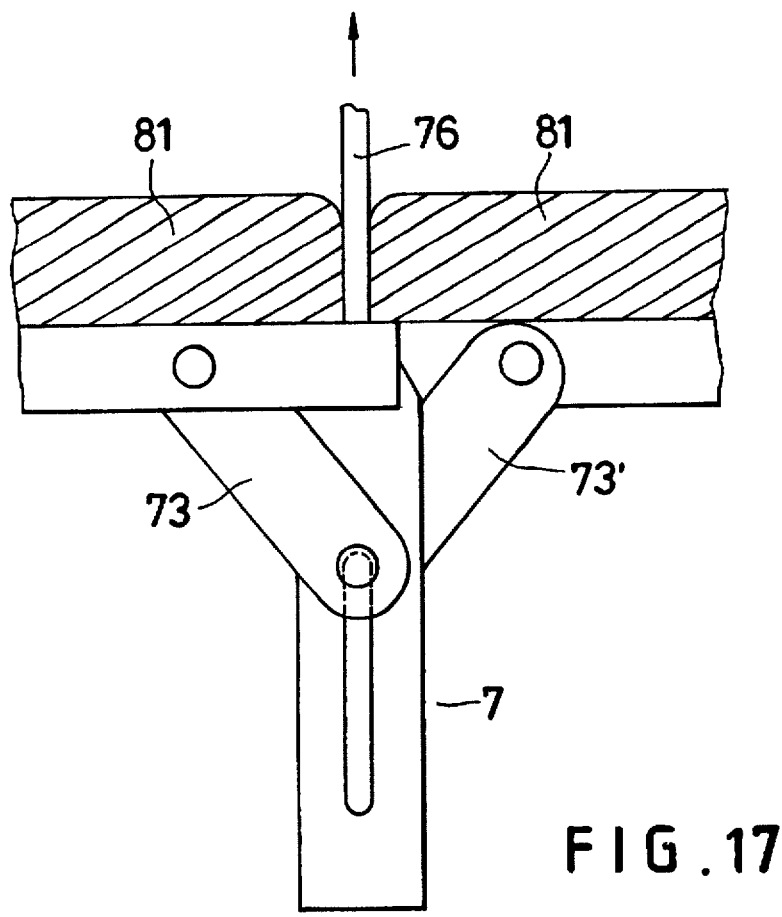
Figure 16:
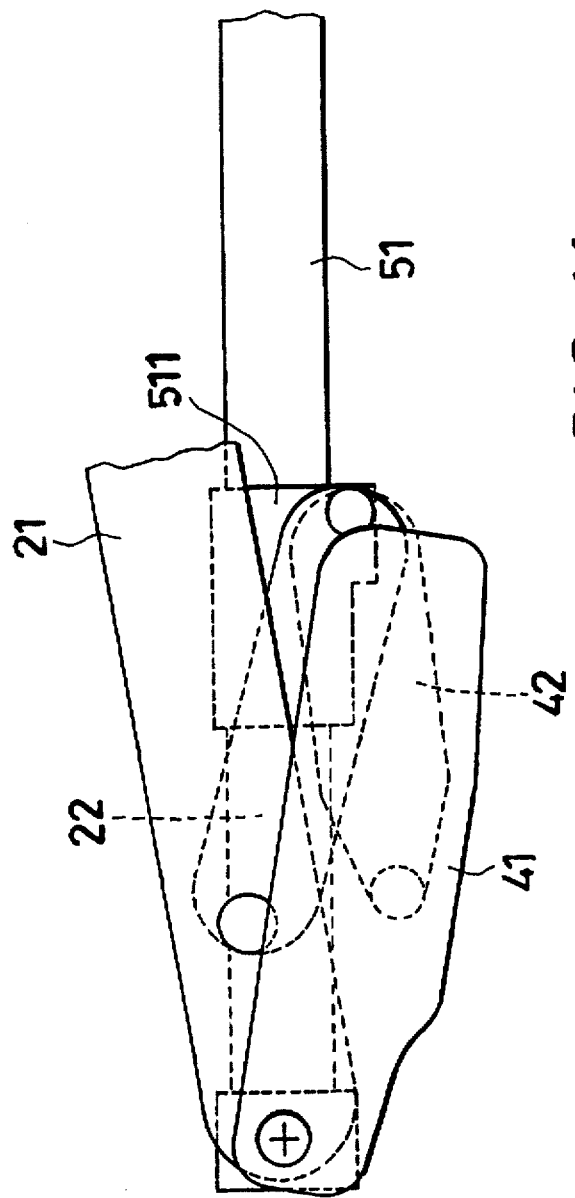
FIG. 16 is a side view of the foot, the vertical rod and the link piece of the preferred embodiment of the present invention, showing them in a folded position.
Figure 18:
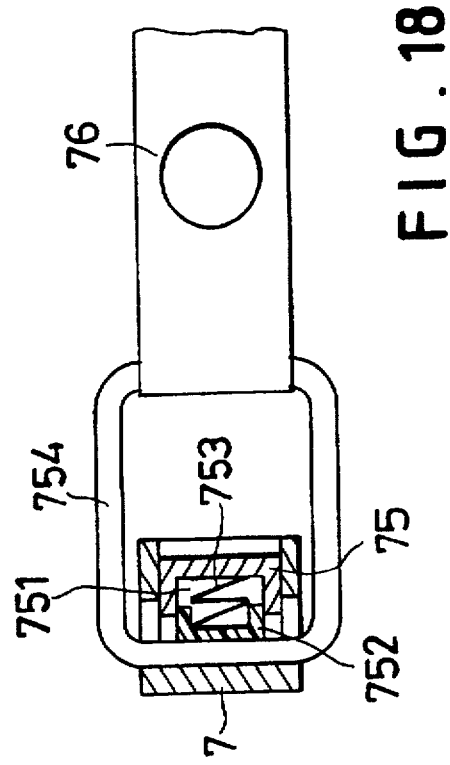
FIG. 18 is an upper cross-sectional view of a pull band, a bind band and a slide member of the preferred embodiment of the present invention, before the pull band is pulled inward and upward.
Figure 19:
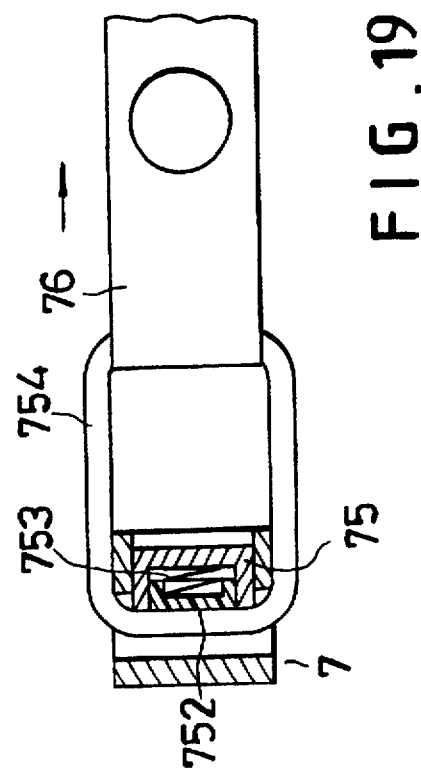
FIG. 19 is an upper cross-sectional view of the pull band, the bind band and the slide member of the preferred embodiment of the present invention, after the pull band is pulled.

When the playpen is to be collapsed from the extended condition, first the fold joints 3 are pulled outward, disengaging the teeth 331 of the engage block 33 from the tooth shaped recesses 312 of the inner tooth member 31. Then the press button 36 is pressed down to displace the engage block 33, forcing the large and the small sector-shaped projections of the swingable member 34 to disengage from the respective large and the small sector-shaped recesses 333, 334 of the engage block 33, so that the fold joints 3 may be folded inwardly. The upper frame 1 moves to lie on the lower frame 5, as shown in FIGS. 9 and 10. Meanwhile, the feet 21 are folded inwardly, with the link pieces 22 pushing the movable sleeves 511 to one side and with the feet 41 moved by the link pieces 42 and folded as shown in FIGS. 15 and 16. After that, the pull band 76 is pulled inwardly, as shown in FIGS. 17, 19 and 21, the U-shaped piece 752 being pulled to move into the slide block 75 and to leave the cavity 74 of the slide member 7. The whole framework is thereby folded, with the slide block 75 being pushed by the link pieces 73, 73' and moving along the slot 71 to its lower end, as shown in FIGS. 11, 12, 23, 24, and 26. Then the whole framework is collapsed completely, and the back band 83 is used for carrying the playpen on one's shoulder.

As can be understood from the above description, this invention has the following advantages.

1. It is easy to be extended and collapsed.

2. In collapsing it, the floor pad need not be removed, and the collapsing process can be carried out directly and conveniently.

3. After it is collapsed, it can be carried on one's shoulder with the back band.

While the preferred embodiment of the invention has been described above, it will be recognized and understood that various modifications may be made therein and the appended claims are intended to cover all such modifications which may fall within the spirit and scope of the invention.

What is claimed is:

1. A baby playpen comprising an upper frame, a lower frame, a four feet connected to four foot bases and coupling said upper frame to said lower frame, said upper frame including two lengthwise rods each having an intermediate fold connector for folding said lengthwise rods and two first lateral rods, said two lengthwise rods being connected to said two first lateral rods by four corner joints, each of said corner joints being coupled to a respective one of said four feet, each of said feet having two half portions connected together by an intermediate fold joint, each of said foot bases respectively having a post connected to one end of a first link piece, said first link piece having an opposing end connected to a movable sleeve slidably coupled to an end portion of a second lateral rod of said lower frame, said lower frame including two second lateral rods located on opposing sides of said lower frame and two straight rods connected to two bent rods by two first connecters and two slide members, said two bent rods also being connected to an intermediate lateral rod extending between said first connecters to form a substantially H-shaped structure, each said straight rod having a first end connected to a second connecter, said second connecter having a movable block formed with a C-shaped channel extending therethrough for receiving a respective second lateral rod of said lower frame therein, said movable block having a vertical stop wall formed on a respective side wall thereof for retention within said second connecter, each said straight rod having a second end pivotally connected to a respective slide member, each of said two bent rods being respectively connected to a respective second lateral rod by a T joint, said two first connecters each being coupled to a respective end of said intermediate lateral rod and pivotally connected to a respective one of said two slide members, each said slide member having an elongated vertical slot respectively formed through two opposing sides thereof, a pin connected to two second link pieces extends through said elongated slots and is slidably displaceable therein, said two second link pieces being respectively connected to an inner end of a respective one of said straight rods and an inner end of a respective one of said bent rods, said slide member having a cavity formed therein for receiving a slide block therein, said slide block having a recess formed therein, said recess of said slide block containing a U-shaped piece and a spring, an annular bind band passes through said cavity and extends over said U-shaped piece, said bind band being connected with a pull band having one end securely sewn to a floor pad placed on a bottom of said playpen, a mesh net covers said upper and lower frames of said playpen, strings extending down from said floor pad are bound on said straight rods and said bent rods to keep said floor pad in place, a back band is secured on rings affixed under said straight and bent rods for carrying said playpen on a user's shoulder after said playpen has been collapsed.

* * * * *